United States Patent [19]

Lu

[11] Patent Number: 5,066,128
[45] Date of Patent: Nov. 19, 1991

[54] DIGITAL PULSE COUNTING METHOD FOR MEASURING THE OPTICAL PATH DIFFERENCE OF AN IMBALANCED INTERFEROMETER

[75] Inventor: Zhuo-Jun Lu, Pierrefonds, Canada

[73] Assignee: Canadian Marconi Co., Montreal, Canada

[21] Appl. No.: 499,798

[22] Filed: Mar. 27, 1990

[30] Foreign Application Priority Data

Sep. 5, 1989 [CA] Canada ................................... 610320

[51] Int. Cl.[5] .............................................. G01B 9/02
[52] U.S. Cl. .................................... 356/349; 356/345; 356/358
[58] Field of Search ....................... 356/345, 349, 358; 250/227.19, 227.27

[56] References Cited

U.S. PATENT DOCUMENTS 4,767,210  8/1988  Kashyap .

OTHER PUBLICATIONS

"Distance Sensing and Tunable Laser Characterization Using an All Fiber-Optic Interferometer", SPIE, vol. 746, Industrial Laser Interferometry 1987, pp. 37 et seq., Strzelecki et al.
"Close Loop FM Interferometric Remote Optical Fiber Sensor", PROC. SPIE Technical Symposium East 83, vol. 412, Fiber Optic and Laser Sensors, pp. 256 et seq., Giles et al.

*Primary Examiner*—Samuel Turner
*Attorney, Agent, or Firm*—Fishman, Dionne & Cantor

[57] ABSTRACT

The interferometer is fed by a laser whose wavelength is modulated. The frequency of the optical fringes generated by modulating the wavelength of the laser are measured. Preferably, the measurement of the frequency is carried out by counting pulses. A system for carrying out the method includes a pulse counter circuit.

3 Claims, 4 Drawing Sheets

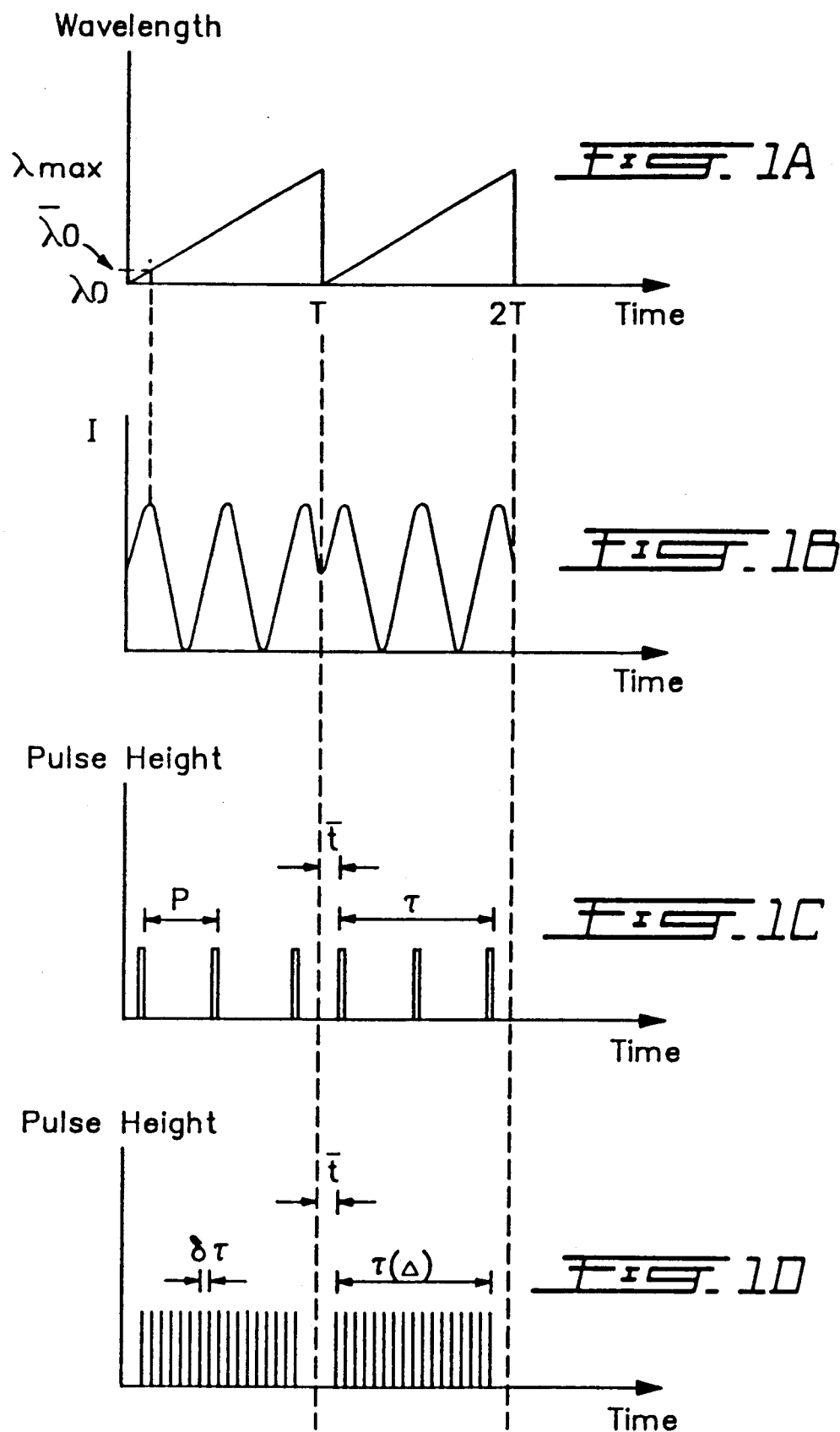

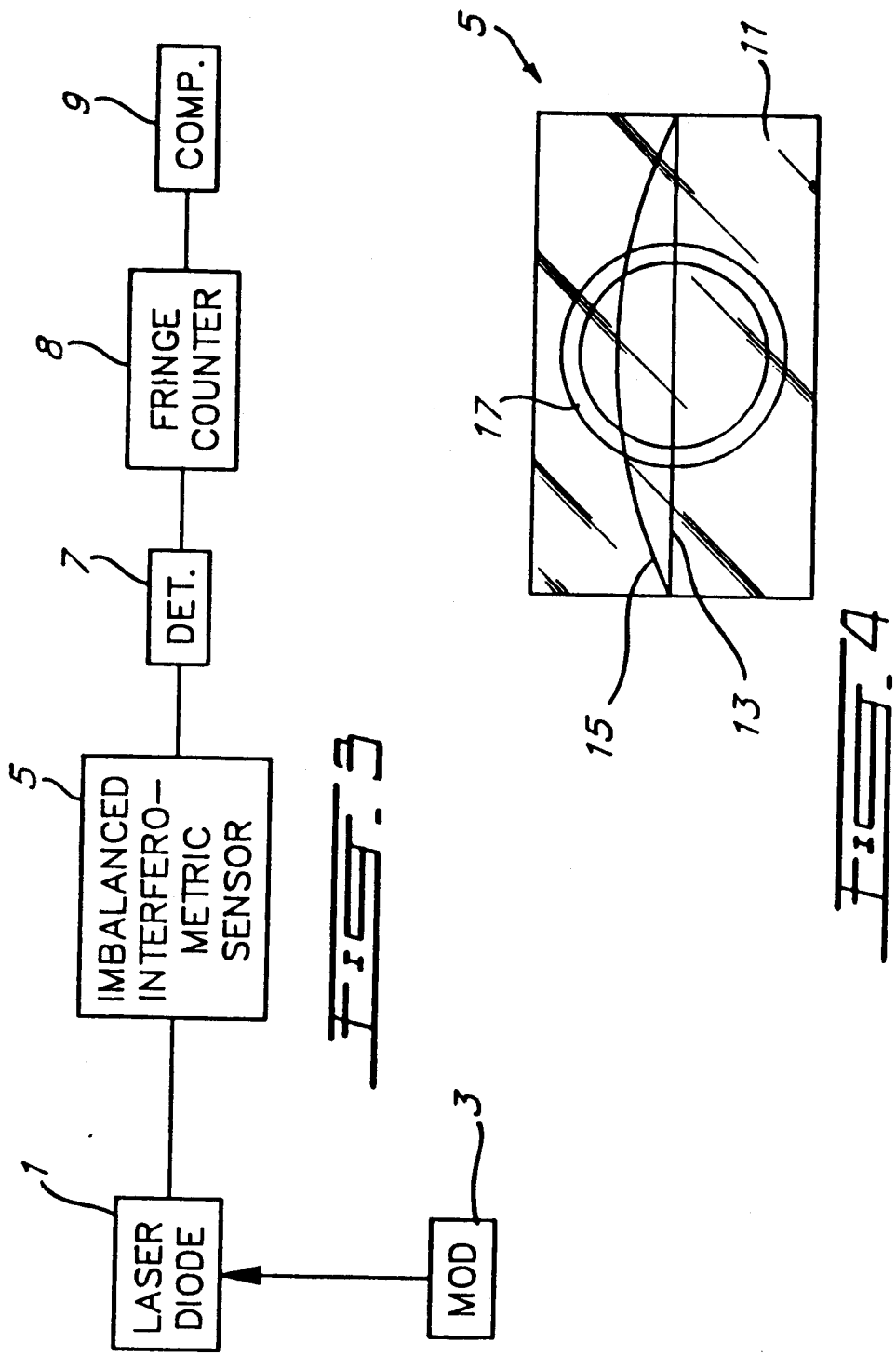

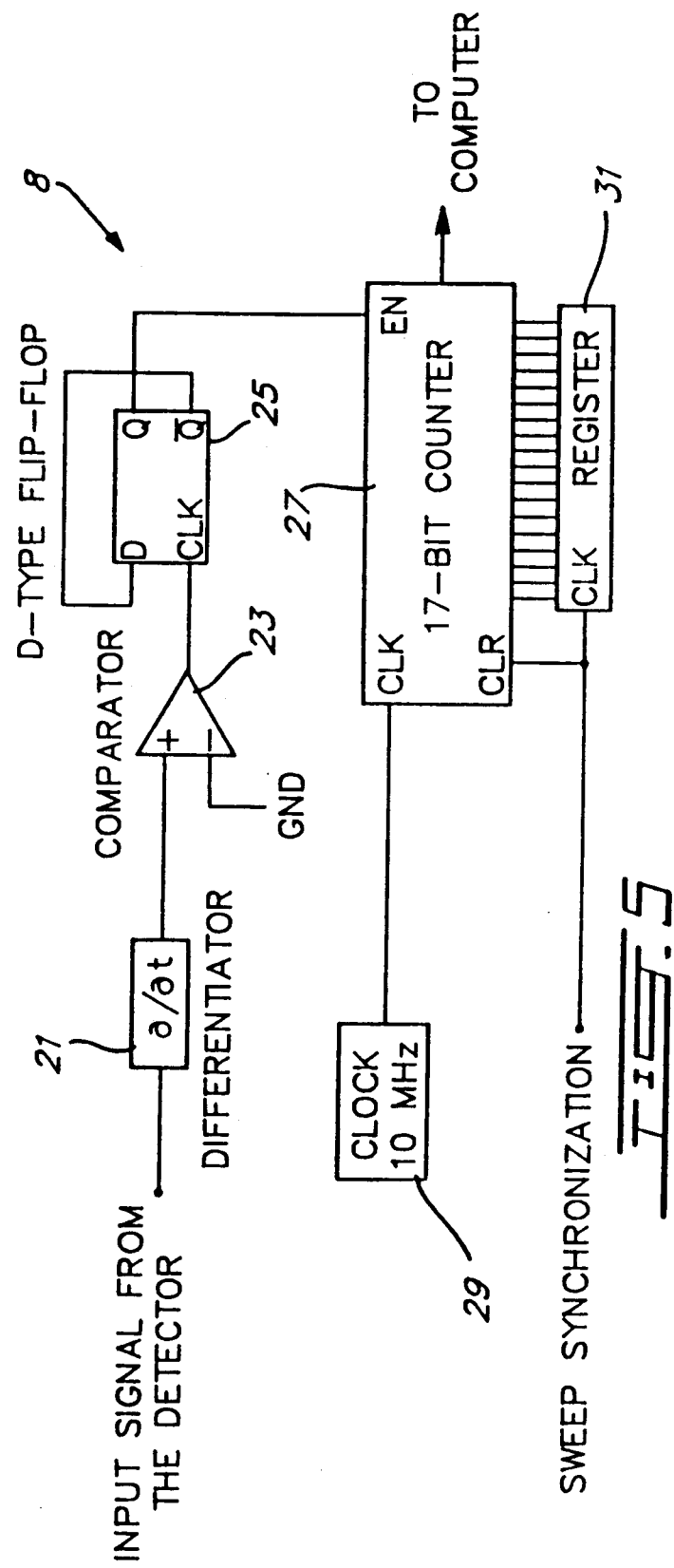

DIGITAL PULSE COUNTING METHOD FOR MEASURING THE OPTICAL PATH DIFFERENCE OF AN IMBALANCED INTERFEROMETER

BACKGROUND OF INVENTION

1. Field of the Invention

The invention relates to a method for measuring the optical path difference of an imbalanced interferometer using a wavelength modulated laser. More specifically, the method includes the step of measuring the frequency of the optical fringes generated by modulating the wavelength of the laser.

The invention also relates to a system for carrying out the method.

2. Description of Prior Art

Optical interferometer measurement systems are known in the prior art as described in, for example, U.S. Pat. No. 4,767,210, which teaches an interferometer having a reference arm and a sensing arm of unequal lengths.

"Distance Sensing and Tunable Laser Characterization using an All Fiber-Optic Interferometer", SPIE, Vol. 746, Industrial Laser Interferometry 1987, pps. 37 et seq., Strzelecki et al, uses interferometeric methods and a tunable laser for measuring distances. "Close Loop FM Interferometric Remote Optical Fiber Sensor", PROC. SPIE Technical Symposium East 83, Vol. 412, Fiber Optic and Laser Sensors, pps. 256 et seq., Giles et al, teaches an approach wherein the path imbalance of an interferometer is measured using a frequency modulated laser.

One of the major problems in developing optical interferometric sensor systems has been the lack of effective methods to determine the optical path difference. The output intensity of an interferometric sensor, e.g. a Mach-Zehnder interferometer, can be expressed as:

$$I_{out} = \tfrac{1}{2} I_{in} \left( 1 + \cos \tfrac{2\pi \Delta}{\lambda} \right) \quad (1)$$

where $I_{out}$ and $I_{in}$ denote, respectively, the output and input intensity of the interferometer, $\lambda$ is the wavelength of the light source, and $\Delta$ is the optical path difference. When a single mode laser is used as a light source of the sensor, the difficulty in measuring $\Delta$ arises from the periodicity of the cosine function. In a rather simplified example, if cos $$\tfrac{2\pi \Delta}{\lambda}$$

is determined as being equal to 0, then $$\tfrac{2\pi \Delta}{\lambda}$$

is equal to $$\tfrac{n\pi}{2}$$

where n is equal to any odd integer. Given that $\lambda$ is fixed, the value of $\Delta$ is directly related to the value of n. However, the system cannot measure the value of n, it can merely determine that cos $$\tfrac{2\pi \Delta}{\lambda}$$

is equal to 0.

Accordingly, a typical sensor must be able to resolve the changes in $\Delta$ from a fraction of a $\lambda$ to possibly hundreds of $\lambda$s.

One of the methods for measuring $\Delta$ is to modulate the wavelength of the laser, i.e., to frequency modulate the laser. See, for example, "Distance Sensing and Tunable Laser Characterization Using an All Fiber-optic Interferometer", SPIE Vol. 746, Industrial Laser Interferometry, p 37, 1987, Strzelecki et al. However, this method is limited for sensor applications, due to the fact that when a laser diode is used, only a very . small wavelength deviation; typically less than a few angstroms, can be achieved before mode hoppings occur. See "Close Loop FM Interferometric Remote Optical Fiber Sensor", Proc. SPIE Technical Symposium East 83, Vol. 412, Fiber Optic and Laser Sensors, p 256, 1983, Uttam et al.

Using an imbalanced interferometer rather than the traditional balance interferometer has the advantage of increasing the sensitivity of the sensor to wavelength changes. Consider the phase of the output intensity from a sensor:

$$\phi = \tfrac{2\pi \Delta}{\lambda} \quad (2)$$

The relative change corresponding to the frequency modulation is given by $$d\phi = 2\pi \tfrac{\Delta}{\lambda} \tfrac{d\lambda}{\lambda} = 2\pi K \tfrac{d\lambda}{\lambda}$$

where $$K = \tfrac{\Delta}{\lambda}.$$

For a balanced interferometer, where K is very close to 0, a large range of wavelength changes is required to achieve a desired phase change. By introducing an imbalanced interferometer with a large K, $d\phi$ can be significantly increased. For example, when $$\tfrac{d\lambda}{\lambda} = 1/2000,$$

an imbalanced interferometer with K approximately equal to 4000 will go through two fringes ($d\phi = 2 \times 2\pi$).

SUMMARY OF INVENTION

It is therefore an object of the invention to provide a method for determining the optical path difference of an imbalanced interferometer fed by a laser whose wavelength is modulated. It is a more specific object of the invention to provide such a method which includes the step of measuring the frequency of the optical fringes generated by modulating the wavelength of the laser.

It is a further object of the invention to provide a system for carrying out the invention.

In accordance with the invention, the method includes the step of measuring the frequency of the optical fringes generated by modulating the wavelength of the laser.

The inventive system includes a means for measuring the frequency of the optical fringes generated by modulating the wavelength of the laser.

BRIEF DESCRIPTION OF DRAWINGS

The invention will be better understood by an examination of the following description, together with the accompanying drawings, in which:

FIGS. 1A to 1D illustrate graphically a scheme for measuring the optical path difference;

FIG. 3 is a block diagram of a system in accordance with the invention;

FIG. 4 illustrates an example of an imbalanced interferometer for use in the above system;

FIG. 5 illustrates schematically an electronic circuit which can be used to measure the frequency of the optical fringes generated by modulating the wavelength of the laser.

DESCRIPTION OF PREFERRED EMBODIMENTS

The concept of the inventive method is based on the fact that, within a small range of wavelength modulation, the frequency of the interferometer output is linearly proportional to $\Delta$. Equation (1) above can be rewritten as follows:

$$I_{out} = \tfrac{1}{2} I_{in}(1 + \cos 2\pi f) \qquad (4)$$

where $f = \Delta/\lambda_o$ is the frequency of the sensor output and $\lambda$ is the wavelength corresponding to the first peak (or minimum) of the sensor output signal.

As seen in FIG. 1, the method comprises the step of modulating the laser wavelength whereby the variation of the wavelength over time is as illustrated in FIG. 1A.

The output of the sensor, which shows intensity of light over time, is as illustrated in FIG. 1B. This output is converted to an electrical signal having the same shape as the curve in FIG. 1B.

In a second step, the electrical signal representative of the shape of the sensor output is converted into a sequence of digital pulses with a period equal to the period of the sensor output. This is illustrated in FIG. 1C.

In a third step, a frequency measurement parameter, $\tau = M \times P$, is defined. M is a given predetermined number and P is the period of the fringes. In FIG. 1C, M=2.

In the fourth step, the time intervals $\tau(\Delta)$ and $\bar{t}$ are measured by pulse counting, i.e., counting the pulses of a digital counter in the period $\tau(\Delta)$ and $\bar{t}$ as illustrated in FIG. 1D.

Ideally, $\tau(\Delta)$ is linearly proportional to $\Delta$, and the relationship can be expressed as:

$$\frac{d\Delta}{\Delta_o} = \frac{df}{f_o} = -\frac{d\tau}{\tau_o} \qquad (5)$$

where $\Delta_o$ is the initial optical path difference of the interferometer (see FIGS. 1A and 1B) and $f_o$ and $\tau_o$ are respectively the corresponding frequency and frequency measurement parameters.

Figure 2A:
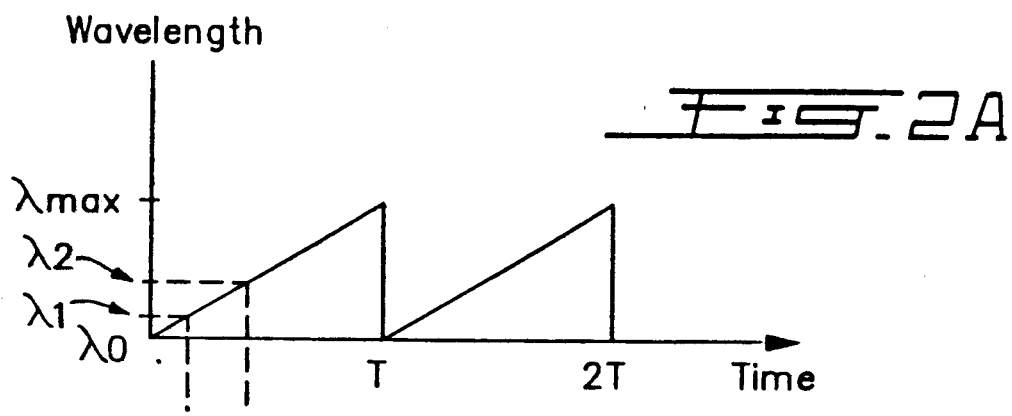
FIGS. 2A to 2D illustrate changes in $\Delta$ with changes in $\lambda_o$.
Figure 2B:
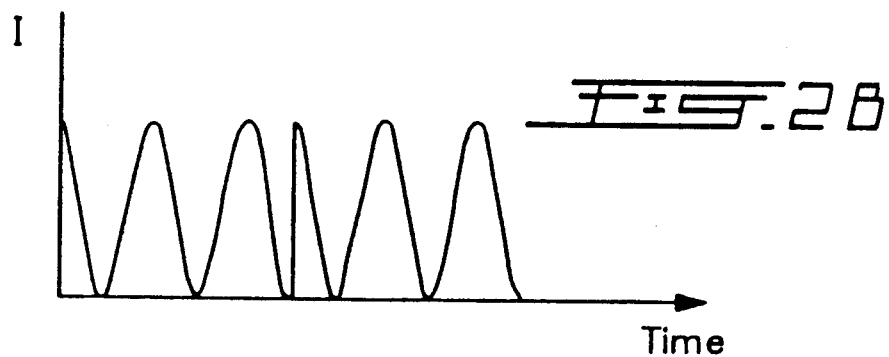
Figure 2C:
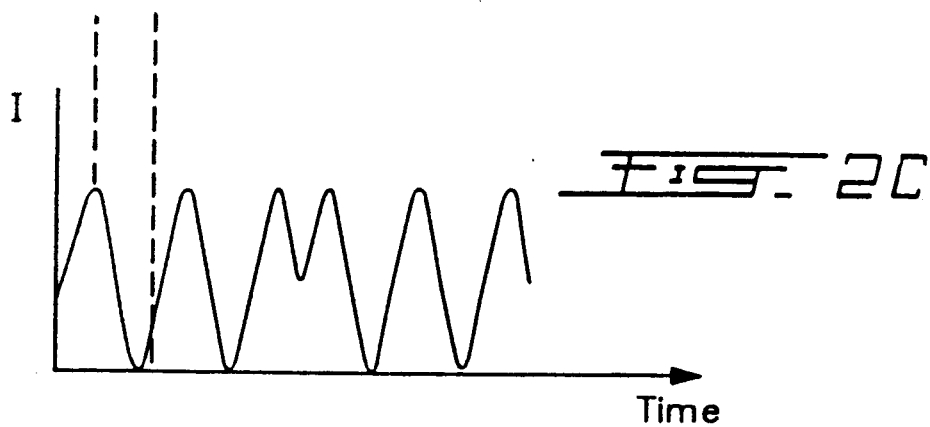
Figure 2D:
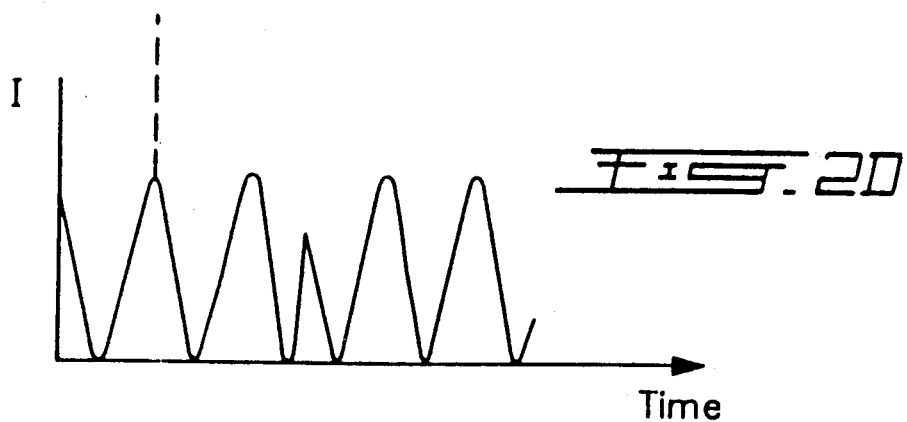

In the above discussion, it has been assumed that $\lambda_o$ does not change. However, as illustrated in FIG. 2, when $\Delta$ changes, $\lambda_o$ will shift (up to one fringe) within the range of wavelength modulation. A compensation factor, $\alpha$, is introduced to correct the error in the frequency measurement caused by this shift.

$$f = \frac{\Delta}{(1 + \alpha)\lambda_o} \qquad (6)$$

$$\text{where } \alpha = \frac{\bar{t}(\lambda_{max} - \lambda_o)}{T \lambda_o}$$

In the above equation, $\bar{t}$ is defined as the time interval from the beginning of each modulation cycle to the first peak of the fringes (see FIG. 1C). Adding the compensation factor to equation (5) gives $$\frac{d\Delta}{\Delta_o} = (1 + \alpha)\frac{df}{f_o} = -(1 + \alpha)\frac{d\tau}{\tau_o} \qquad (7)$$

and $$d\Delta = -\left(1 + \frac{\bar{t}(\lambda_{max} - \lambda_o)}{T \lambda_o}\right)\frac{d\tau}{\lambda_o} \Delta_o \qquad (8)$$

From equation (7), one can derive the resolution of the measurement (or minimum detectable $\Delta$) as $$\delta\Delta \cong \frac{\delta\tau K \lambda_o}{T} \qquad (9)$$

There are tradeoff considerations among the parameters $\delta Y$, K and T. Since the system relies on the ability of measuring the period of the sensor fringes, the minimum number of fringes required by the measurement scheme is two fringes (or $d\phi = 4\pi$) at $\Delta_{min}$. This results in a minimum value for K as $$K_{min} = \frac{2 \lambda_o}{(\lambda_{max} - \lambda_o)}.$$

FIG. 3 illustrates a system for carrying out the method. In FIG. 3, a coherent source of light, for example laser 1, has its wavelength modulated by modulator 3. The modulated output is fed to an imbalanced interferometric sensor 5, and the output of the sensor 5 is fed to a detector 7 which converts the optical output to an electrical output. The electrical output is fed to fringe counter 8 and the output of the fringe counter is fed to a computer which determines $\Delta$ from the measured data.

An example of an imbalanced interferometric sensor 5 is shown in FIG. 4. The sensor comprises a glass substrate 11 on which are impressed optical waveguides 13 and 15. Waveguide 13 is straight while waveguide 15 is curved.

The substrate is mounted on a support 17.

One implementation of a fringe counter is illustrated in FIG. 5. The fringe counter consists of a differentiator 21 whose output is fed to a comparator 23 which compares the output of the differentiator 20. The output of the comparator is fed to the clock terminal of D-type flip-flop 25, and the Q output of the D-type flip-flop is fed to 17-bit counter 27 which is clocked by clock 29.

The count on the counter 27 is stored in register 31. Synchronization is provided by a current sweep signal fed to the clock terminal of register 31 and the clear terminal of counter 27.

The operation of the system illustrated in FIG. 3, up to the detector is well known and will not be described here. Considering the operation of the circuit illustrated in FIG. 5, this measures only $\tau(\Delta)$. A similar circuit can be used to measure $\bar{t}$. The electrical conversion of the intensity signal (the output of the detector) is differentiated and compared to zero. The frequency of the resulting square wave is halved using a D-type flip-flop. This signal can now enable the counter for what corresponds to the time interval separating two adjacent maxima of the input signal.

Although a single embodiment has been described this was for the purpose of illustrating, but not limiting, the invention. Various modifications, which will come readily to the mind of one skilled in the art, are within the scope of the invention as defined in the appended claims.

I claim:

1. A method for measuring the optical path difference of an imbalanced interferometer fed by a laser whose wavelength is modulated, said method comprising the steps of:

applying the output of said laser to said imbalanced interferometer;

measuring light intensity at the output of said imbalanced interferometer, said light intensity comprising a periodic signal having a frequency;

converting the light intensity signal to an electrical signal having the same frequency;

converting the electrical signals to a series of pulses having the sam frequency as the electrical signals;

providing a series of clock pulses having a frequency greater than the frequency of the series of pulses;

counting the clock pulses between two adjacent measured pulses, the count comprising a parameter P;

defining a frequency measurement parameter $\tau = M \times P$ where M is a given predetermined number;

determining $\Delta$ from the equation:

$$\frac{d\Delta}{\Delta_o} = -\frac{d\tau}{\tau_o}$$

where $\Delta_o$ = the initial optical path difference of the interferometer
$\tau_o$ = frequency measurement parameter at $\Delta$
$\Delta$ = said optical path difference.

2. A method as defined in claim 1 and including the step of adding a compensation factor such that $$f = \frac{\Delta}{(1 + \alpha)\lambda_o}$$

where $$\alpha = \frac{\bar{t}(\lambda_{max} - \lambda_o)}{T\tau_o}$$

where
$\bar{t}$ = time interval from the beginning of each modulation cycle to the first peak of fringes
T = period of the modulation cycle
$\lambda_{max}$ = the maximum wavelength of the modulated laser
$\lambda_o$ = the minimum wavelength of the modulated laser determining $\Delta$ from the expression $$d\Delta = -\left(1 + \frac{\bar{t}(\lambda_{max} - \lambda_o)}{T\tau_o}\right)\frac{d\tau}{\tau_o}\Delta_o.$$

3. A system for measuring the optical path difference of an imbalanced interferometer using a digital pulse counting method, comprising:

a frequency modulated laser having an output;

imbalanced interferometric sensor having an input, connected to the output of said laser, and an output;

the output of said interferometric sensor comprising a light intensity periodic signal having a frequency;

means for converting said light intensity signal to an electrical signal having the same frequency;

means for converting the electrical signal to a series of digital pulses having the same frequency;

clock means for providing a series of clock pulses at a frequency greater than the frequency of said digital pulses;

means for counting the clock pulses between two adjacent digital pulses;

means for counting the clock pulses between a predetermined integral number of digital pulses;

computer means for determining the optical path difference of the interferometer from the above measured data.

* * * * *

UNITED STATES PATENT AND TRADEMARK OFFICE
CERTIFICATE OF CORRECTION

PATENT NO. : 5,066,128

DATED : November 19, 1991

INVENTOR(S) : ZHUO-JUN LU

It is certified that error appears in the above-identified patent and that said Letters Patent is hereby corrected as shown below:

On the title page, and Col. 1, line 1:

In the title, after "COUNTING METHOD" add --AND SYSTEM--.

Column 1, line 2, after "Counting Method" add --AND SYSTEM--.

Column 2, line 12, change "Fiber-optic" to --Fiber-Optic--.

Column 3, line 14, change "$\lambda_o$" to --$\bar{\lambda}_o$--.

Column 3, line 33, change "$\lambda$" to --$\bar{\lambda}_o$--.

Column 3, line 65, change "$\lambda_o$" to --$\bar{\lambda}_o$--.

Column 3, line 67, change "$\lambda_o$" to --$\bar{\lambda}_o$--.

Column 4, line 8, change "$t(\lambda max - \lambda_o)$" to --$\bar{t}(\lambda_{max} - \lambda_o)$--.

Column 4, line 20, change "$t(\lambda max - \lambda_o)$" to --$\bar{t}(\lambda_{max} - \lambda_o)$--.

Column 4, line 31, change "Y" to --$\tau$--.

Column 5, line 31, change "sam" to --same--.

Column 5, line 47, change "$\Delta$" to --$\Delta_o$--.

Column 6, line 10, change "$t(\lambda max - \lambda_o)$" to --$\bar{t}(\lambda_{max} - \lambda_o)$--.

Column 6, line 23, change "$t(\lambda max - \lambda_o)$" to --$\bar{t}(\lambda_{max} - \lambda_o)$--.

Signed and Sealed this

Sixth Day of April, 1993

*Attest:*

STEPHEN G. KUNIN

*Attesting Officer*      *Acting Commissioner of Patents and Trademarks*